(12) United States Patent
Lanteires

(10) Patent No.: US 7,712,439 B2
(45) Date of Patent: May 11, 2010

(54) METHOD FOR CONTROLLING OPERATION OF THE CYLINDER OF AN INTERNAL COMBUSTION ENGINE, AN ENGINE COMPRISING A CYLINDER OPERATING ACCORDING SAID METHOD AND A MOTOR VEHICLE PROVIDED WITH SAID ENGINE

(75) Inventor: Fabien Lanteires, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 36 days.

(21) Appl. No.: 10/562,417

(22) PCT Filed: Jun. 4, 2004

(86) PCT No.: PCT/FR2004/001398

§ 371 (c)(1),
(2), (4) Date: Jun. 5, 2006

(87) PCT Pub. No.: WO2005/010334

PCT Pub. Date: Feb. 3, 2005

(65) Prior Publication Data

US 2007/0056536 A1  Mar. 15, 2007

(30) Foreign Application Priority Data

Jun. 25, 2003  (FR) .................................. 03 07692

(51) Int. Cl.
*F01L 1/34* (2006.01)

(52) U.S. Cl. .................. 123/90.15; 123/90.17; 123/347; 123/406.47

(58) Field of Classification Search .............. 123/90.15, 123/90.16, 90.17, 90.18, 345, 346, 347, 348, 123/406.32, 406.45, 406.47
See application file for complete search history.

(56) References Cited

U.S. PATENT DOCUMENTS

| 5,183,011 A | 2/1993 | Fujii et al. |
| 5,647,312 A | 7/1997 | Esch et al. |
| 6,182,621 B1 | 2/2001 | Esch et al. |
| 6,484,677 B2 | 11/2002 | Brehob et al. |

FOREIGN PATENT DOCUMENTS

WO  WO 0179675 A1 * 10/2001

\* cited by examiner

*Primary Examiner*—Ching Chang
(74) *Attorney, Agent, or Firm*—Nicolas E. Seckel

(57) ABSTRACT

In this method, during the same operating cycle of the cylinder, the following phases are carried out:
an opening phase at the exhaust (OE-OF);
a first opening phase at the intake (OA1-FA1);
a second opening phase at the intake (OA2-FA2);
a fuel injection phase (OI-FI) and
a combustion phase.

The exhaust closing time (FE) is between the first intake opening time (OA1) and the second intake opening time (OA2).

The invention also relates to an internal-combustion engine having a cylinder which operates in accordance with such a method, and a motor vehicle provided with such an engine.

16 Claims, 6 Drawing Sheets

METHOD FOR CONTROLLING OPERATION OF THE CYLINDER OF AN INTERNAL COMBUSTION ENGINE, AN ENGINE COMPRISING A CYLINDER OPERATING ACCORDING SAID METHOD AND A MOTOR VEHICLE PROVIDED WITH SAID ENGINE

The present invention relates to a method for controlling the operation of a cylinder of an internal-combustion engine, the cylinder being provided with a combustion chamber which can be opened or closed at the intake and opened or closed at the exhaust, and at least one fuel injector, in which method, during the same operating cycle of the cylinder, the following phases are carried out:

an opening phase at the exhaust between an exhaust opening time and an exhaust closing time;
a first opening phase at the intake between a first intake opening time after the exhaust opening time and a first intake closing time;
a second opening phase at the intake between a second intake opening time and a second intake closing time;
a fuel injection phase between an injection start time and an injection end time; and
a combustion phase for the air/fuel mixture contained in the chamber.

Such a control method is already known in the prior art, in particular from document FR 2 796 418, and is generally intended to inhibit knocking phenomena, without significantly inhibiting the efficiency of the engine.

The invention relates to such a control method, further allowing an increase in the intake of the engine by scavenging the residual burnt gases, without producing additional pollutants.

To that end, in a control method in accordance with the invention, the exhaust closing time is between the first intake opening time and the second intake opening time.

That arrangement leads to a phase during which the intake opening is opened whilst the exhaust opening is not yet closed. That first opening phase at the intake, referred to as the "pilot opening", precedes at least partially the opening at the intake known as the "main opening". The pilot opening, which is brought about whilst the combustion chamber is still open at the exhaust, allows the residual burnt gases to be replaced with unburnt gases. Those fresh gases increase the filling of the engine without producing pollutants.

In that manner, a pressure wave is further produced in the cylinder, further allowing the intake to be improved.

According to other features of the method in accordance with the invention:

the first intake closing time is after the exhaust closing time;
the first intake closing time precedes the second intake opening time.

By way of a variant, the second intake opening time precedes the first intake closing time.

According to still another feature of the method according to the invention, the first intake closing time precedes the injection start time.

By way of a variant, the injection start time precedes the first intake closing time.

In accordance with still another feature of the method according to the invention, the injection start time is between the first intake opening time and the exhaust closing time.

By way of a variant, the exhaust closing time precedes the injection start time.

In accordance with an advantageous feature of the method according to the invention, the amplitude of the opening at the intake is adjusted so that the amplitude of the opening during the first opening phase at the intake is different from the amplitude of the opening during the second opening phase at the intake.

The invention also relates to an internal-combustion engine having at least one cylinder which is provided with a combustion chamber which can be opened or closed at the intake and opened or closed at the exhaust, and at least one fuel injector, characterized in that the cylinder operates in accordance with a method as defined above.

Specific embodiments of the invention will now be described with reference to the Figures of the appended drawings, in which.

Figure 1:
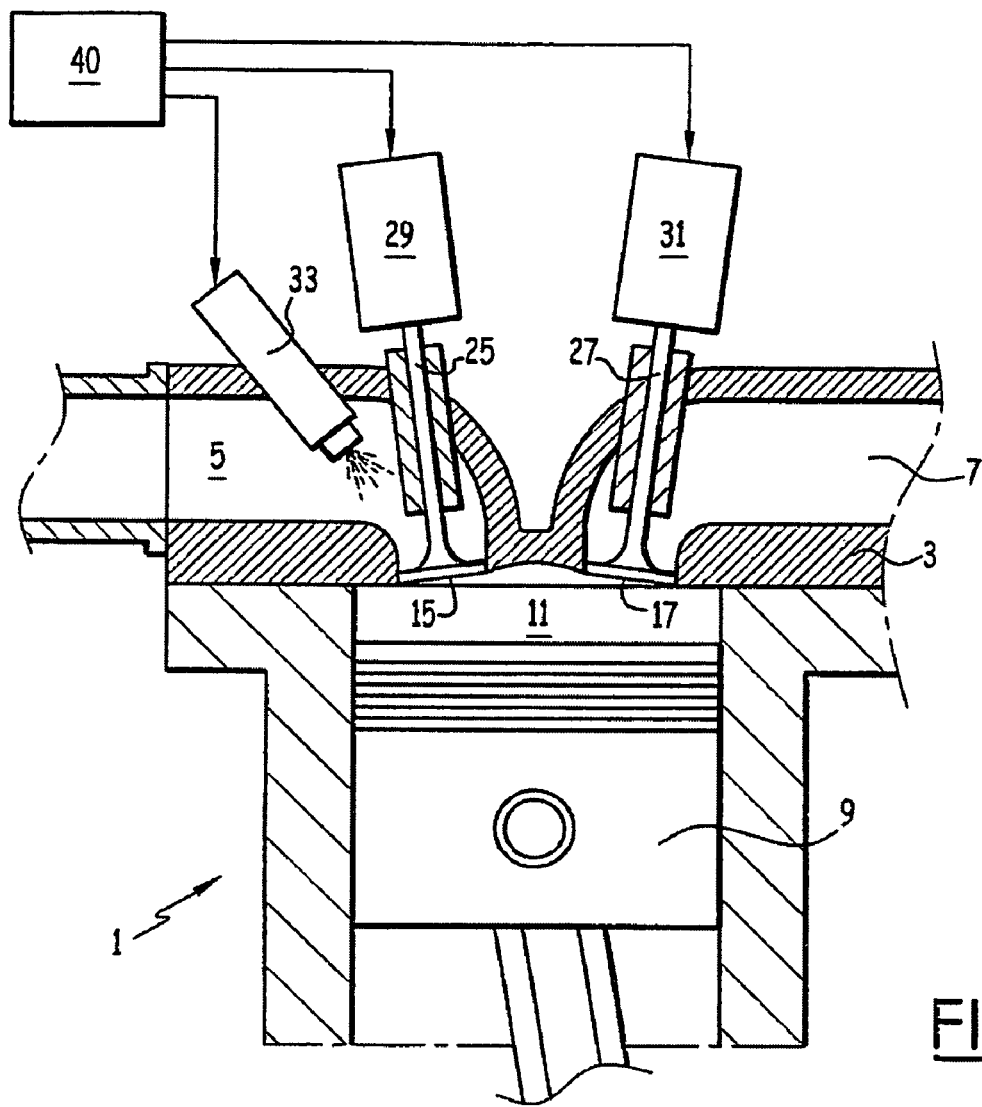
FIG. 1 is a partially sectioned schematic view, in an axial plane, of a cylinder of an internal-combustion engine of a motor vehicle, of a first type suitable for carrying out a method in accordance with the invention.

FIG. 1 is a sectional view of part of an internal-combustion engine of a motor vehicle. That part of the engine substantially comprises a cylinder 1 and a cylinder head 3 which covers that cylinder and in which, at one side, an intake duct 5 and, at the other side, an exhaust duct 7 are formed.

A piston 9 which is mounted so as to slide inside the cylinder delimits, with the cylinder head 3 and the peripheral walls of the cylinder, a combustion chamber 11. The intake duct 5 and the exhaust duct 7 open into the combustion chamber 11 by way of an intake opening 15 and an exhaust opening 17, respectively.

The engine part illustrated further comprises an intake valve 25 and an exhaust valve 27 which are associated with the cylinder 1 and which are controlled by respective actuators 29, 31 so as to selectively close or open the intake opening 15 and the exhaust opening 17, respectively.

The engine part which is illustrated and associated with the cylinder 1 further comprises a fuel injector 33 which is provided in order to inject fuel into the intake duct 5 in a manner controlled electronically.

The control of the actuators 29, 31 and the injector 33 is brought about by an electronic control and management unit 40. That electronic control and management unit 40 also brings about control of ignition in the combustion chamber 11 by means of an ignition plug which is not illustrated.

Figure 2:
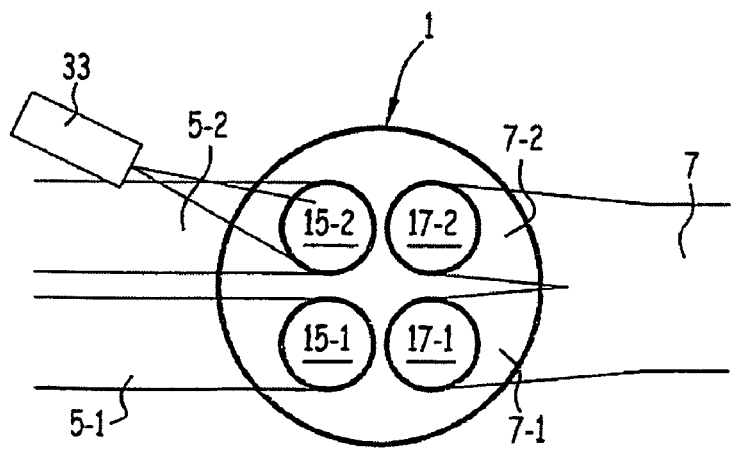
FIG. 2 is a partial schematic plan view of a cylinder of an internal-combustion engine of a motor vehicle, of a second type suitable for carrying out a method in accordance with the invention.

FIG. 2 schematically illustrates part of the engine similar to that of FIG. 1, but which substantially differs in that it comprises two intake ducts 5-1, 5-2 which open separately into the combustion chamber of the cylinder 1 via respective separate intake openings 15-1, 15-2. Each intake opening 15-1, 15-2 is associated with a respective intake valve, the two valves being able to be controlled independently of each other.

In the embodiment illustrated in FIG. 2, the injector 33 is arranged so as to supply fuel only in one 5-2 of the intake ducts so that the other 5-1 of the intake ducts can direct only air towards the combustion chamber. In other words, the air/fuel mixture is introduced into the combustion chamber only by way of the duct 5-2.

In the embodiment illustrated in FIG. 2, there are also provided two exhaust openings 17-1, 17-2 which communicate with two respective exhaust ducts 7-1, 7-2 which extend separately as far as a junction to form a common exhaust duct 7. It will be assumed below that the two exhaust openings 17-1, 17-2 are associated with two respective exhaust valves which are moved with linked and identical movements so that the two valves and the two exhaust openings 17-1, 17-2 can be combined in an assembly of a single exhaust valve and a single exhaust opening, as illustrated in FIG. 1.

However, it will be understood that the invention is not limited to such an arrangement, nor to phase type control of the valves.

With reference to FIGS. 3 to 12, there will now be described a plurality of embodiments of the control method in accordance with the invention. That method will be illustrated by means of charts showing the opening and closing phases of the intake and exhaust valves, as well as the fuel injection phase.

In those charts, the operating phases of the valves and the injector will be represented by the state $\epsilon$ of the valves over periods of time t corresponding to angular ranges of rotation a of the crankshaft. The state of the valves will be assumed to be either completely open ($\epsilon > 0$) or completely closed ($\epsilon = 0$) so as to simplify the graphic representation of the operating phases. Thus, it will be assumed that the lifting or state variable $\epsilon$ of the valves, represented on the ordinate, changes instantaneously from one to the other of its minimum value (equal to 0) and its maximum value (always taken to be equal to 1 by convention, except for the embodiments of FIGS. 11 and 12).

Each embodiment of the control method can be carried out with one and/or the other of the cylinder configurations illustrated in FIGS. 1 and 2. When the configuration of FIG. 1 is adapted for carrying out an embodiment of the method, that embodiment can also be carried out with the configuration of FIG. 2, in which the two intake valves, at one side, and the two exhaust valves, at the other side, are permanently in the same state, and therefore moved with identical movements and can therefore be combined in a single intake valve and a single exhaust valve, respectively.

Figure 3:
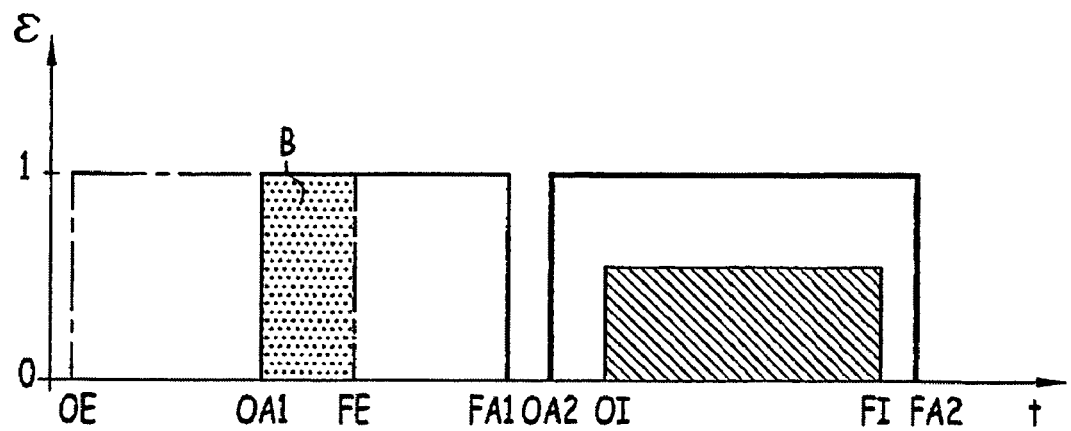
FIGS. 3 to 12 are charts representing intake, exhaust and injection commands, each corresponding to a control method in accordance with a particular embodiment of the invention.

First Method: FIG. 3

This method can be carried out with the configuration of FIG. 1.

An operating cycle of the cylinder firstly comprises an opening phase at the exhaust, defined by an initial exhaust opening time OE and a final exhaust closing time FE.

That phase allows the combustion gases which are produced during the preceding cycle and which are contained in the combustion chamber to be discharged.

The operating cycle further comprises a first opening phase at the intake, defined by a first initial intake opening time OA1 and a first final intake closing time FA1.

The cycle further comprises a second opening phase at the intake, defined by a second initial intake opening time OA2 and a second final intake closing time FA2.

The cycle further comprises a fuel injection phase which is defined by an injection start time OI and an injection end time FI.

As is visible, the second opening phase at the intake is after the first phase, the injection phase being carried out during that second opening phase at the intake.

The first opening phase at the intake will be referred to as "pilot opening" whilst the second opening phase at the intake will be referred to as "main opening".

The first opening time at the intake OA1 occurs during the opening phase at the exhaust so that there is overlap between the opening phase at the exhaust and the pilot intake phase. That overlap phase B can be referred to as the "scavenging phase" for the residual burnt gases. During that phase, there is produced an elevated pressure wave in the combustion chamber owing to the rapid introduction of non-carburetted air (or fresh air) which scavenges the residual burnt gases which are contained in the combustion chamber.

The exhaust closing time FE occurs after the first intake opening time OA1 and before the second intake opening time OA2, that is to say, between the start of the pilot intake phase and the start of the main intake phase, during which combustion occurs.

In this embodiment, the exhaust closing time FE occurs before the end of the pilot intake phase and the pilot and main intake phases are separate, that is to say that they occur during the overlap phase. Furthermore, the valve lifting strokes during the pilot intake phase and during the main intake phase are of the same amplitude.

Figure 4:
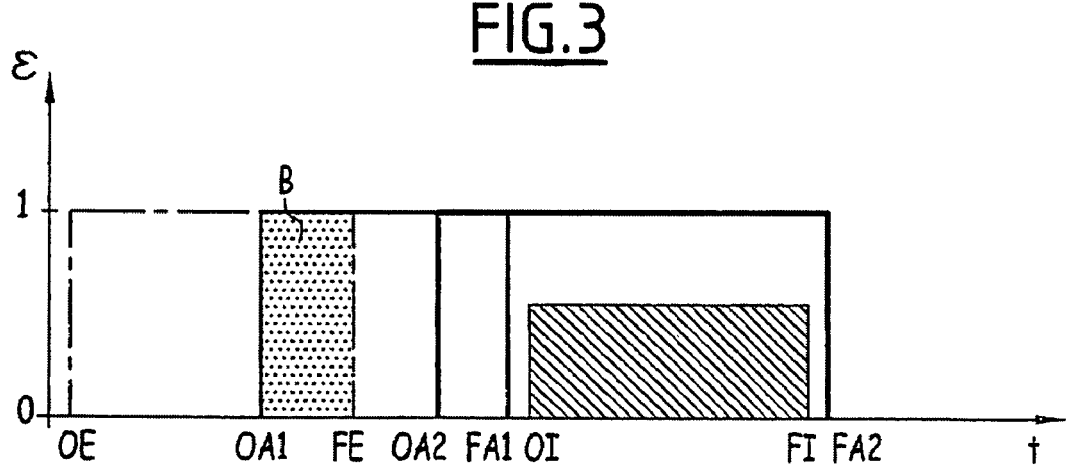

Second Method: FIG. 4

This method can be applied only to a configuration having two intake valves, in particular in accordance with FIG. 2.

This second embodiment differs from the first only in that the main intake phase and the pilot intake phase have an overlap phase, that is to say that the first intake closing time FA1 occurs after the second intake opening time OA2. In this embodiment, the time FA1 occurs before the injection start time OI.

In this embodiment, and in all those embodiments which can be carried out only with a configuration having two intake valves, the pilot intake phase is carried out by the valve positioned in the first intake duct 51, whilst the main intake phase is carried out by the valve which is positioned in the second intake duct 52 which is provided with the injector 33.

Figure 5:
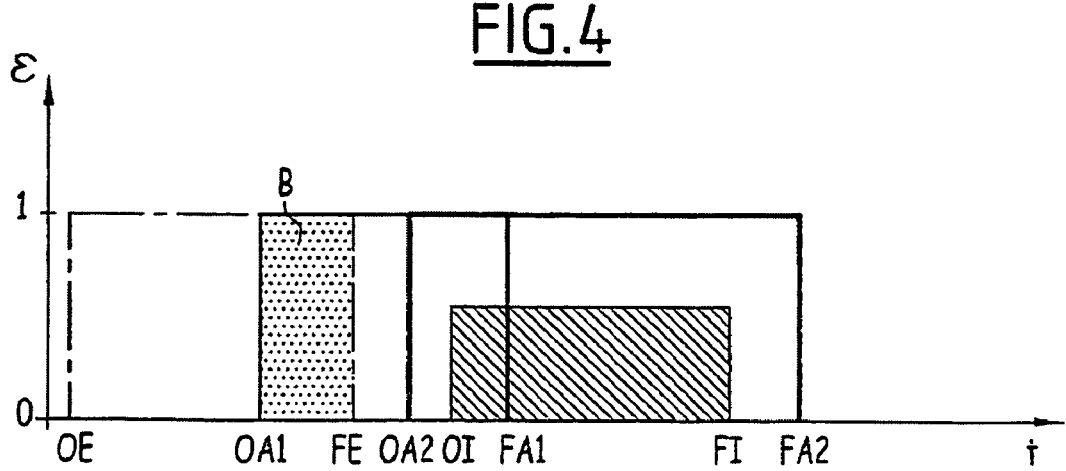

Third Method: FIG. 5

This method is also carried out with a configuration according to FIG. 2.

This third embodiment differs from the second only in that the injection start time OI occurs before the end of the pilot intake phase, that is to say, before the time FA1.

Figure 6:
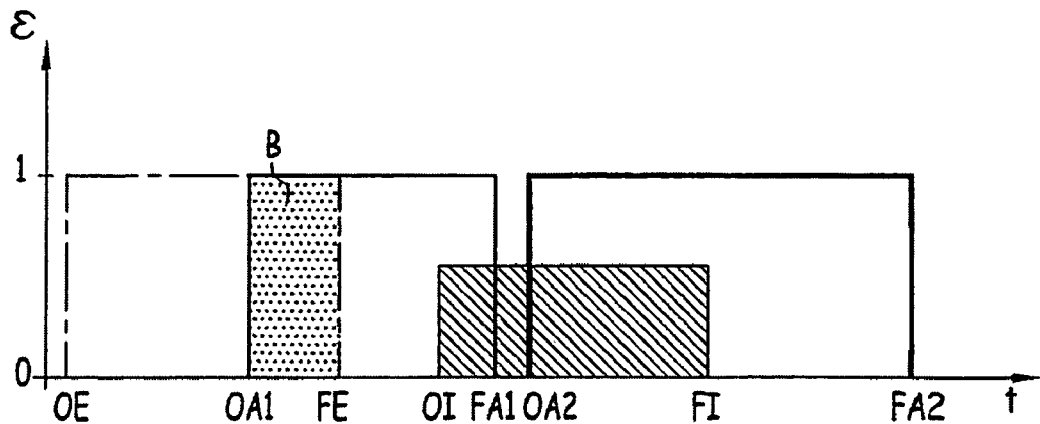

Fourth Method: FIG. 6

This embodiment of the method can be carried out with a configuration in accordance with FIG. 1.

The pilot and main intake phases are separate, as in the first embodiment.

That feature constitutes the only difference between this embodiment and the third method illustrated in FIG. 5, the injection phase beginning before the end of the pilot intake phase.

Figure 7:
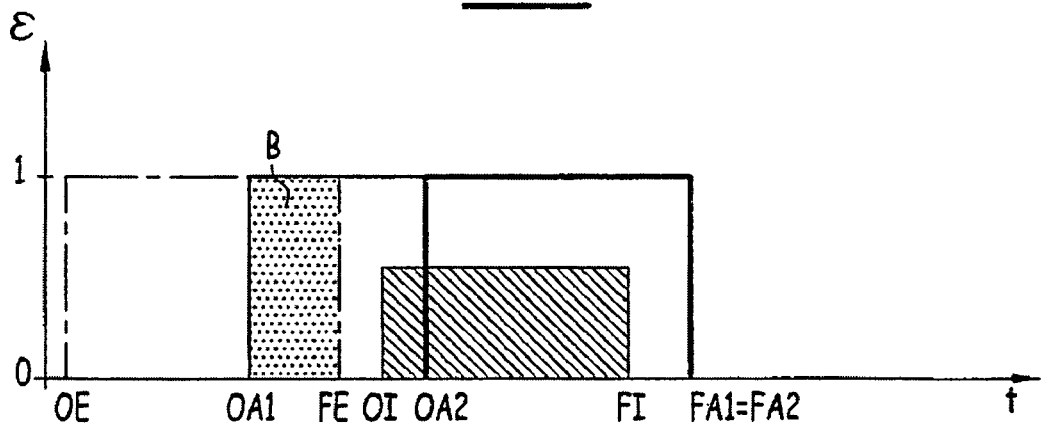

Fifth Method: FIG. 7

This method can be carried out with the configuration of FIG. 2.

It differs from the preceding method only in that the pilot intake phase continues up to the end of the main intake phase, the times FA1 and FA2 overlapping.

Figure 8:
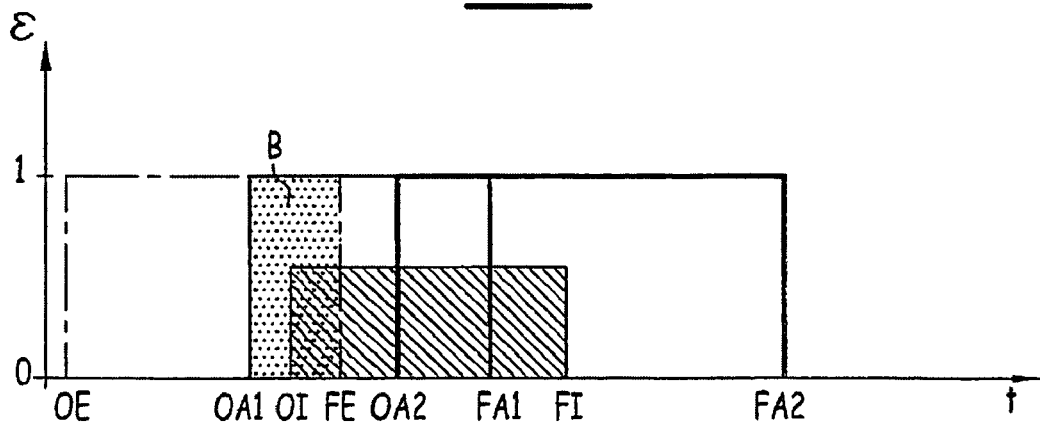

Sixth Method: FIG. 8

This method can be carried out with the configuration of FIG. 2.

It differs from the third method illustrated in FIG. 5 only in that the injection phase begins during the overlap phase B between the pilot and main intake phases (or scavenging phase). In other words, the time OI occurs between the times OA1 and FE. The injection end time FI is, as in the preceding case, between the times FA1 and FA2.

Figure 9:
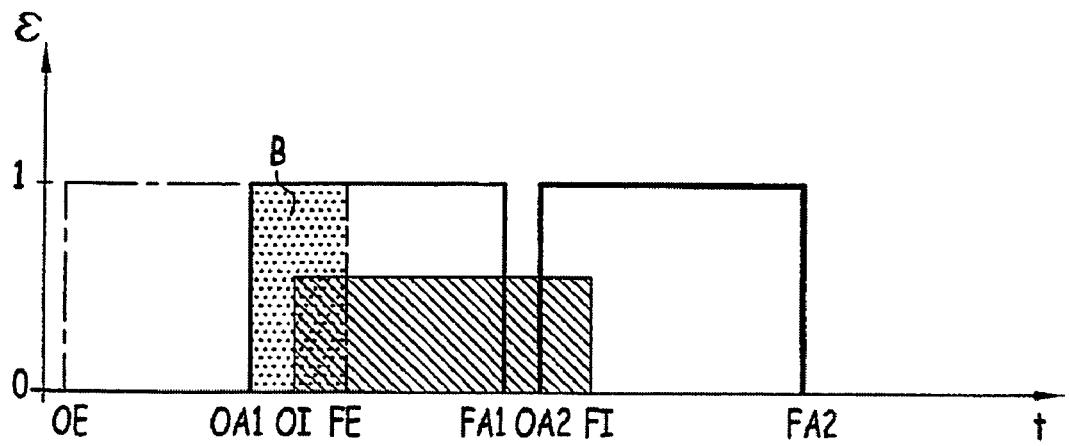

Seventh Method: FIG. 9

This method can be carried out with the configuration of FIG. 1, the pilot and main intake phases being carried out successively without any overlap.

This embodiment differs only slightly from the preceding embodiment in that the pilot intake phase ends before the start of the main intake phase, the injection start time OI occurring during the scavenging phase B and the injection end time FI occurring during the main intake phase.

Figure 10:
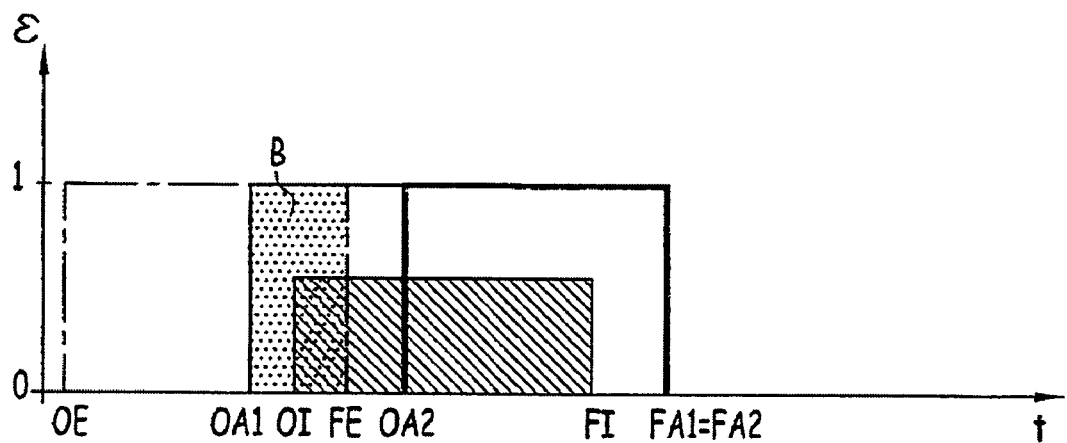

Eighth Method: FIG. 10

This method can be carried out only with the configuration of FIG. 2.

It differs from the method 7 of FIG. 9 only in that the pilot intake phase continues up to the end of the main intake phase, the times FA1 and FA2 overlapping.

Figure 11:
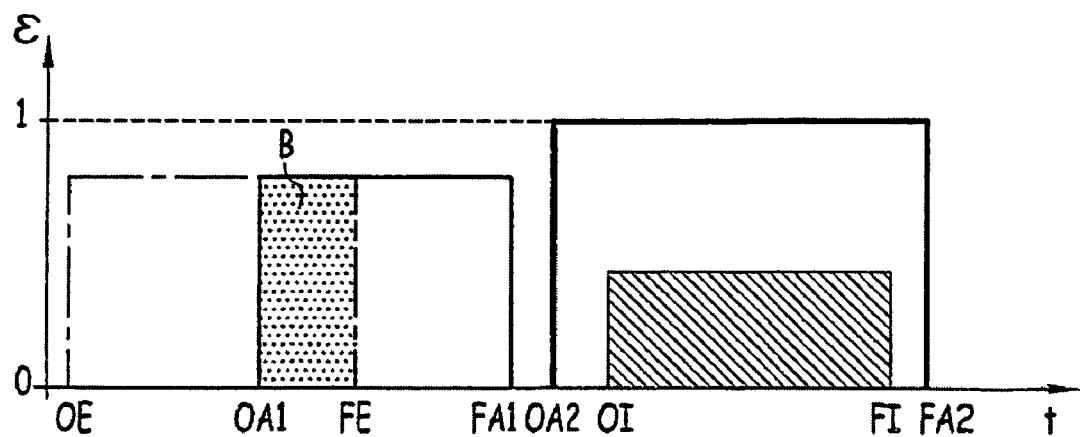

Ninth Method: FIG. 11

This method is similar to the first method illustrated in FIG. 3 in that the sequence of the various phases in the same operating cycle is identical in both cases.

Nevertheless, it differs in that the opening (or lifting) amplitude of the intake valve during the pilot intake phase is less than the amplitude of the intake valve during the main intake phase. During the pilot intake phase, the state variable $\epsilon$ of the intake valve is represented at a value less than 1 in order to illustrate a smaller opening amplitude.

Figure 12:
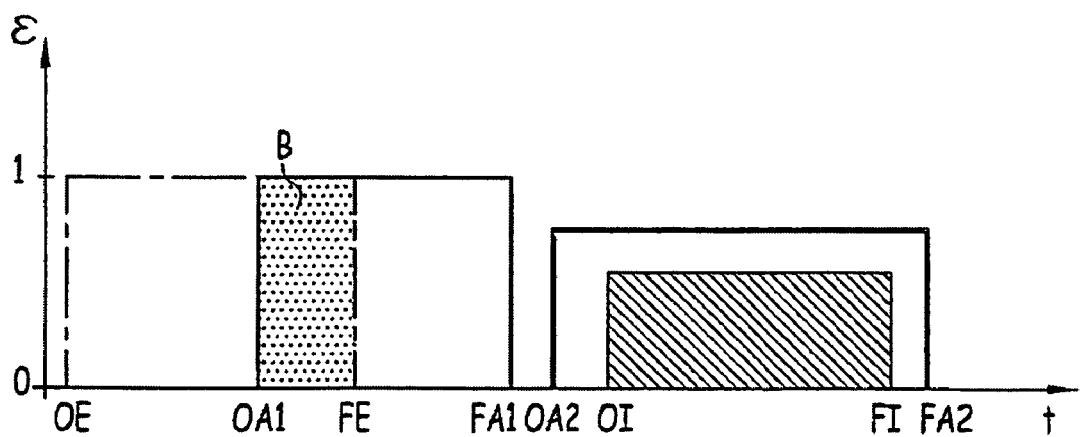

Tenth Method: FIG. 12

This method differs from the preceding method only in that the opening amplitude during the pilot intake phase is greater than that during the main intake phase. In this embodiment, the state variable $\epsilon$ of the intake valve during the main phase is represented at a value less than 1.

The last two methods illustrated, that is to say, those of FIGS. 11 and 12, illustrate that an optional feature of the control method according to the invention consists in conferring different amplitudes on the intake valve (or the intake valves) depending on whether the pilot intake phase or the main intake phase is involved. Naturally, that feature could be applied to each of the embodiments which have been described above.

Finally, it should be noted that, when two intake phases follow one after the other without any overlap (first, fourth and seventh methods), it is possible to carry out the invention with a configuration in accordance with FIG. 1, but also with a configuration in accordance with FIG. 2.

In that last case, the first intake phase can be carried out by opening a first intake valve whilst the second intake phase can be carried out by opening the second intake valve, or the first intake valve again.

Figure 13:
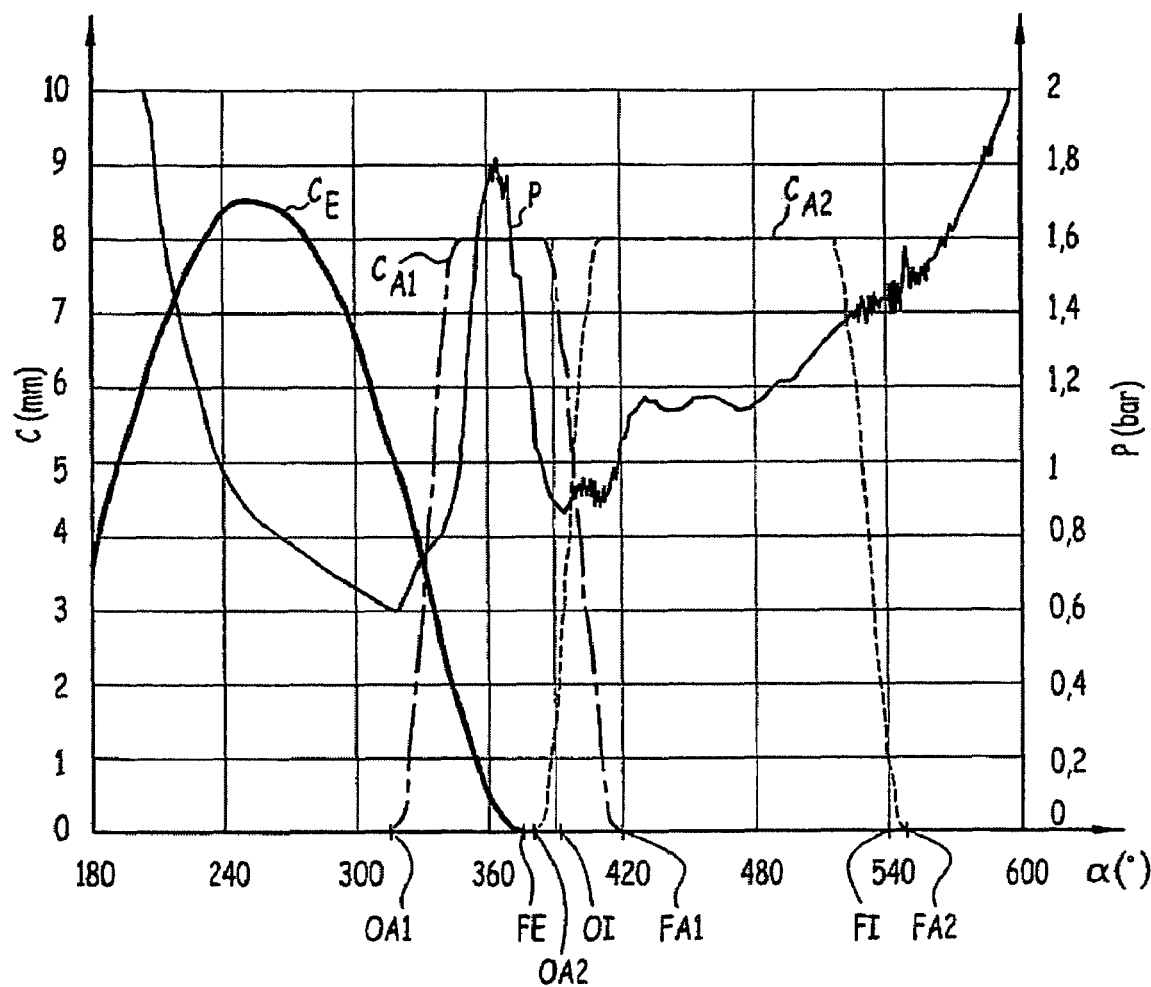
FIG. 13 is a graph illustrating the variation in pressure present in the cylinder during the various phases of the method that are illustrated in FIG. 5.

Now with reference to FIG. 13, there are represented, in the same graph, the lifting position or travel C of the valves, and the pressure P present in the cylinder, as a function of the angular position $\alpha$ of the camshaft.

The opening of the valves is measured in mm of travel (or lifting), that measurement being indicated on the ordinate located on the left of the graph.

The pressure P is measured in bar and indicated on the ordinate located on the right.

The angular position a of the crankshaft, measured in degrees, is indicated on the abscissa.

The data represented on that graph correspond to the embodiment of FIG. 5.

This graph shows the line $C_E$ representing the opening of the exhaust valve, the line $C_{A1}$ representing the opening of the intake valve in the pilot phase and the line $C_{A2}$ representing the opening of the intake valve in the main phase.

It has been found that, in the same operating cycle, the pressure decreases substantially during the exhaust opening phase, as far as a minimum reached at the pilot intake opening time OA1.

When the pilot intake is opened, the pressure can increase very rapidly up to a pressure peak located substantially at the centre of the pilot opening phase. The pressure subsequently decreases during the closing of the pilot intake valve. It again increases during the main intake phase and, of course, during combustion after the end of the main intake opening phase.

The pressure peak which appears during the pilot intake phase, which is attributable to the introduction of fresh gases into the combustion chamber, facilitates and accentuates the scavenging phenomenon of the residual burnt gases, comprising the discharge of those gases via the exhaust duct, out of the combustion chamber.

That peak is representative of an air pressure wave which appears in the cylinder and which allows the filling of the cylinder to be increased, thereby contributing to greater efficiency of the engine.

That pressure wave, which produces a scavenging effect, results from the pilot intake phase and the existence of a phase during which the chamber is opened at the intake and, at the same time, at the exhaust.

However, it will be appreciated that the pressure wave producing the scavenging of the residual burnt gases appears owing to a difference in pressure between the intake and exhaust openings. That wave may of course have a profile other than the form of a peak.

All the embodiments of the invention which have been described allow this result to be obtained.

A method in accordance with the invention may be carried out by executing, by means of the unit 40, a corresponding control program.

The invention claimed is:

1. A method for controlling the operation of a cylinder of an internal-combustion engine, the cylinder being provided with a combustion chamber which can be opened or closed at the intake and opened or closed at the exhaust, and at least one fuel injector, in which method, during the same operating cycle of the cylinder, the following phases are carried out:

an opening phase at the exhaust between an exhaust opening time (OE) and an exhaust closing time (FE);

a first opening phase at the intake between a first intake opening time (OA1) after the exhaust opening time (OE) and a first intake closing time (FA1);

a second opening phase at the intake between a second intake opening time (OA2) and a second intake closing time (FA2);

a fuel injection phase between an injection start time (OI) and an injection end time (FI); and a combustion phase for the air/fuel mixture contained in the chamber (11), wherein the exhaust closing time (FE) is between the first intake opening time (OA1) and the second intake opening time (OA2), wherein the injection start time (OI) is between the first intake opening time (OA1) and the exhaust closing time (FE), and wherein the first intake closing time (FA1) precedes the second intake opening time (OA2).

2. The method according to claim 1, wherein the first intake closing time (FA1) is after the exhaust closing time (FE).

3. The method according to claim 2, wherein the second intake opening time (OA2) precedes the first intake closing time (FA1).

4. The method according to claim 2, wherein the first intake closing time (FA1) precedes the injection start time (OI).

5. The method according to claim 2, wherein the injection start time (OI) precedes the first intake closing time (FA1).

6. The method according to claim 2, wherein the exhaust closing time (FE) precedes the injection start time (OI).

7. The method according to claim 2, wherein the amplitude of the opening at the intake is adjusted so that the amplitude of the opening during the first opening phase at the intake is different from the amplitude of the opening during the second opening phase at the intake.

8. The method according to claim 2, wherein the phases are carried out during each operating cycle of the cylinder.

9. The method according to claim 1, wherein the first intake closing time (FA1) precedes the injection start time (OI).

10. The method according to claim 1, wherein the injection start time (OI) precedes the first intake closing time (FA1).

11. The method according to claim 1, wherein the exhaust closing time (FE) precedes the injection start time (OI).

12. The method according to claim 1, wherein the amplitude of the opening at the intake is adjusted so that the amplitude of the opening during the first opening phase at the intake is different from the amplitude of the opening during the second opening phase at the intake.

13. The method according to claim 1, wherein the phases are carried out during each operating cycle of the cylinder.

14. An internal-combustion engine having at least one cylinder which is provided with a combustion chamber which can be opened or closed at the intake and opened or closed at the exhaust, and at least one fuel injector, wherein the cylinder operates in accordance with a method according to claim 1.

15. A motor vehicle comprising an internal-combustion engine according to claim 14.

16. A method for controlling the operation of a cylinder of an internal-combustion engine, the cylinder being provided with a combustion chamber which can be opened or closed at the intake and opened or closed at the exhaust, and at least one fuel injector, in which method, during the same operating cycle of the cylinder, the following phases are carried out:

an opening phase at the exhaust between an exhaust opening time (OE) and an exhaust closing time (FE);

a first opening phase at the intake between a first intake opening time (OA1) after the exhaust opening time (OE) and a first intake closing time (FA1);

a second opening phase at the intake between a second intake opening time (OA2) and a second intake closing time (FA2);

a fuel injection phase between an injection start time (OI) and an injection end time (FI); and a combustion phase for the air/fuel mixture contained in the chamber (11), wherein the exhaust closing time (FE) is between the first intake opening time (OA1) and the second intake opening time (OA2), wherein the injection start time (OI) is between the first intake opening time (OA1) and the exhaust closing time (FE), and wherein the first intake closing time (FA1) precedes the injection start time (OI).

* * * * *